(12) United States Patent
Schmitt

(10) Patent No.: US 7,924,955 B2
(45) Date of Patent: Apr. 12, 2011

(54) METHOD AND ARTICLE OF ESTIMATING OF PHASE AND GAIN MISMATCH AND CORRESPONDING METHOD AND DEVICE FOR RECEIVING A DIGITAL BASE BAND SIGNAL

(75) Inventor: Jean Schmitt, Palaiseau (FR)

(73) Assignee: Dibcom, Palaiseau (FR)

( * ) Notice: Subject to any disclaimer, the term of this patent is extended or adjusted under 35 U.S.C. 154(b) by 695 days.

(21) Appl. No.: 11/367,903

(22) Filed: Mar. 3, 2006

(65) Prior Publication Data

US 2006/0203942 A1   Sep. 14, 2006

(30) Foreign Application Priority Data

Mar. 3, 2005 (EP) ..................................... 05290482

(51) Int. Cl.
*H04L 27/08* (2006.01)
(52) U.S. Cl. ....................................... 375/345; 375/340
(58) Field of Classification Search .................. 375/345, 375/340

See application file for complete search history.

(56) References Cited

U.S. PATENT DOCUMENTS

| 7,016,426 | B1 * | 3/2006 | Balz et al. ..................... 375/261 |
| 2003/0231726 | A1 | 12/2003 | Schuchert et al. |
| 2004/0203472 | A1 | 10/2004 | Chien |

FOREIGN PATENT DOCUMENTS

DE      19948383      4/2001

OTHER PUBLICATIONS

European Search Report dated Jul. 12, 2005 (8 pages).

* cited by examiner

*Primary Examiner* — David C Payne
*Assistant Examiner* — Nader Bolourchi
(74) *Attorney, Agent, or Firm* — Grossman, Tucker, Perreault & Pfleger, PLLC

(57) ABSTRACT

The method is for estimating a phase and gain mismatch of a base band digital signal. It comprises:
- determining (10) weight coefficients depending upon the likelihood of the frequency values of a segment of said base band digital signal; and
- determining (26) the phase and gain mismatch for the segment using the weight coefficients.

17 Claims, 3 Drawing Sheets

US 7,924,955 B2

METHOD AND ARTICLE OF ESTIMATING OF PHASE AND GAIN MISMATCH AND CORRESPONDING METHOD AND DEVICE FOR RECEIVING A DIGITAL BASE BAND SIGNAL

RELATED APPLICATIONS

The subject application claims the priority of European Regional Application No. 05290482.8 filed on 03 Mar. 2005.

FIELD OF INVENTION

The present invention relates to estimation of phase and gain mismatch, especially in the case of co-channel signals.

BACKGROUND OF THE INVENTION

OFDM or COFDM is a multicarrier modulation technology where the available transmission channel bandwidth is subdivided into a number of discrete channels or carriers that are overlapping and orthogonal to each other. Data are transmitted in the form of symbols that have a predetermined duration and encompass some number of carried frequencies. The data transmitted over these OFDM or COFDM symbol carriers may be encoded and modulated in amplitude and/or phase, using conventional schemes.

In harsh environments and especially mobile environments, a received signal undergoes signal degradation and in particular, the received signal is submitted to co-channel reception, i.e. the signal is submitted to spurious frequency noise also called frequency anomalies due to other signals transmitted in the same channel.

In known devices, the received signal is converted into a base band digital signal. These operations are achieved in a conventional way by an analog front end tuner. The signal is then processed to estimate the phase and gain mismatch for ulterior compensation.

However, in the known devices, the co-channel signals are not dealt with and accordingly, the estimation of phase and gain mismatch is biased, leading to an incorrect estimation and thus an incorrect correction.

Therefore, it is desirable to develop a new method and a corresponding device to estimate the phase and gain mismatch of a base band digital signal in order to improve the quality of the estimation, especially under co-channel conditions.

OBJECT OF THE INVENTION

Accordingly, it is an object of the invention to provide an improved method of estimation of phase and gain mismatch for a base band digital signal, as recited in claim 1. The method also provides correcting the phase and gain mismatch when receiving a base band digital signal, as recited in claim 9.

SUMMARY OF THE INVENTION

In the above, the method deals more efficiently with co-channel conditions as frequency anomalies in the frequency spectrum of the signal are detected and weighted. Therefore, the estimation is non-biased and thus a further correction is significantly improved.

Other features and advantages of the method are recited in the dependent claims.

In addition, the invention concerns an article and a digital signal receiver adapted to achieve a phase and gain mismatch estimation according to the method of the invention, as recited in claims 12 and 13.

Other features of the receiver are further recited in the dependent claims.

BRIEF DESCRIPTION OF THE DRAWINGS

These and other aspects of the invention will be apparent from the following description and drawings upon which.

DETAILED DESCRIPTION OF THE DISCLOSURE

Figure 1:
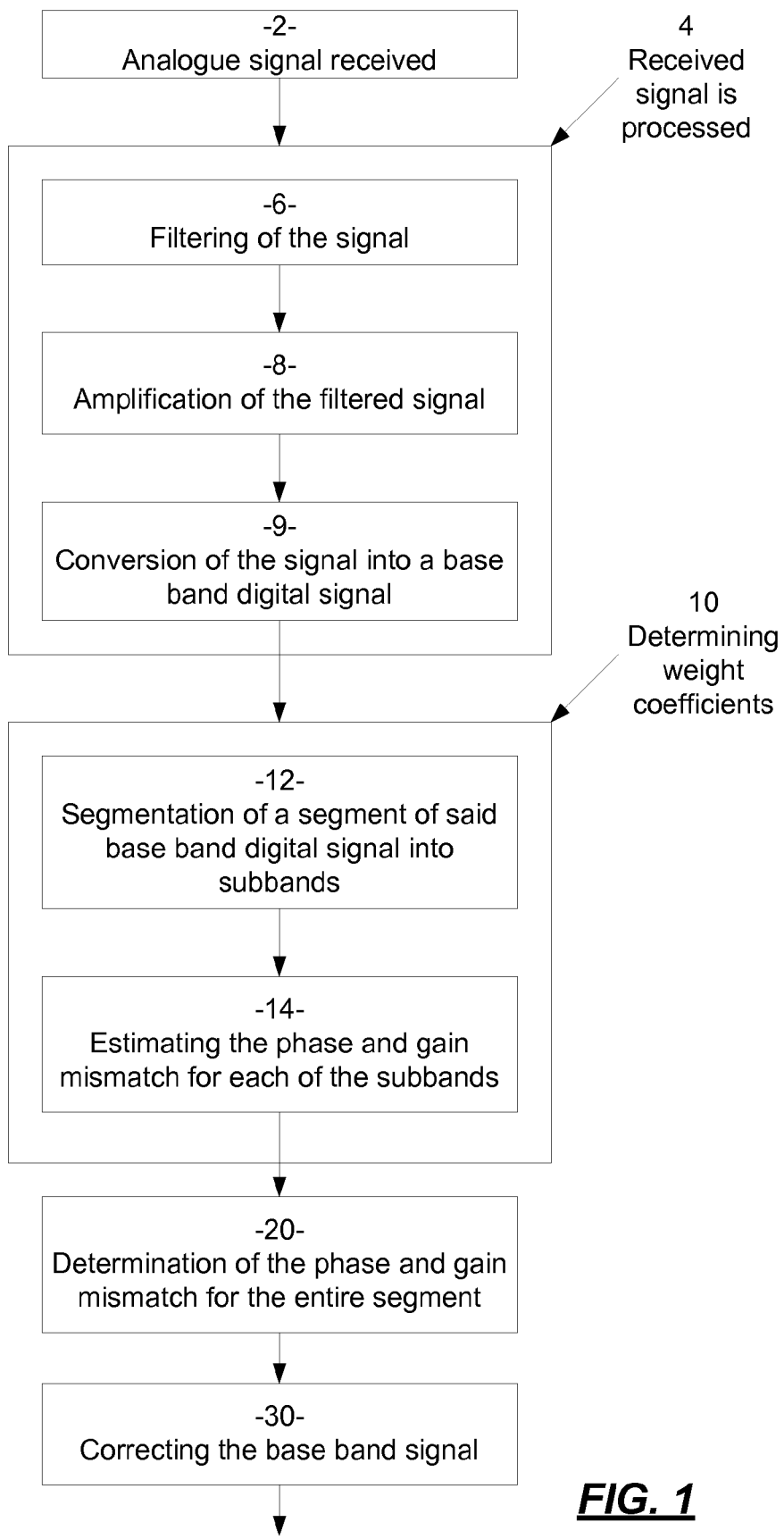
FIG. 1 is a flow chart of a first embodiment of the method according to the invention.

Referring to FIG. 1, a method for receiving a digital base band signal is illustrated. An analog signal corresponding to an OFDM or COFDM signal is received in a step 2. In the example, the frequency spectrum of the received signal comprises anomalies due to other signals transmitted in the same channel and called herein co-channel signals.

The received signal is then processed in a step 4 comprising, for example, filtering of the signal in a substep 6, followed by an amplification of the filtered signal in a substep 8 and a conversion of the signal into a base band digital signal in a substep 9.

Accordingly, steps 2 and 4 are adapted to deliver in a conventional way a base band digital signal corresponding to the symbols of the OFDM or COFDM signal.

Thereafter, the method continues by determining weight coefficients depending upon the likelihood of the frequency values of the base band digital signal in a step 10. The base band digital signal is supposed to have a predetermined type of frequency spectrum defined, in the example, by a norm. Accordingly, the likelihood of the frequency values is an estimation of the matching between the frequency spectrum type of the received signal and the predetermined frequency spectrum type of the emitted signal.

Figure 2A:
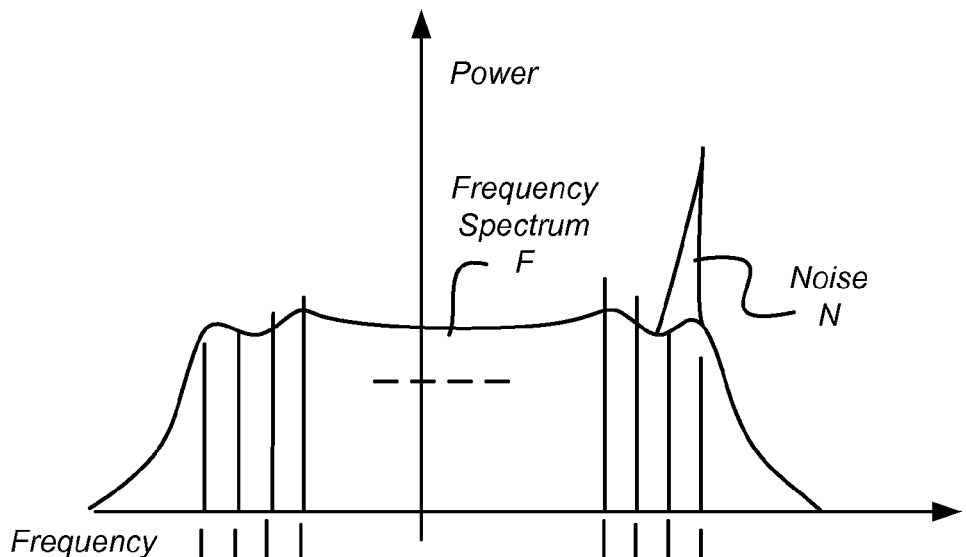
FIGS. 2A and 2B represent different values during the method as described in step 1.

In the example described, the step 10 comprises the segmentation of a segment of said base band digital signal into subbands in frequency in a substep 12 as represented in FIG. 2A, curve F being the frequency spectrum of the signal with a spurious noise identified by the letter N. This segmentation is achieved, for example, by filtering the signal several times with complex filters, one subband corresponding to the filtered signal. Accordingly, the segmentation comprises several steps of filtering, each of them delivering one subband of the signal. The width of each subband depends on the filter used and the desired number of subbands.

The step 10 continues by estimating the phase and gain mismatch for each of the subbands in a substep 14, these estimations are achieved in a conventional way.

Figure 2B:
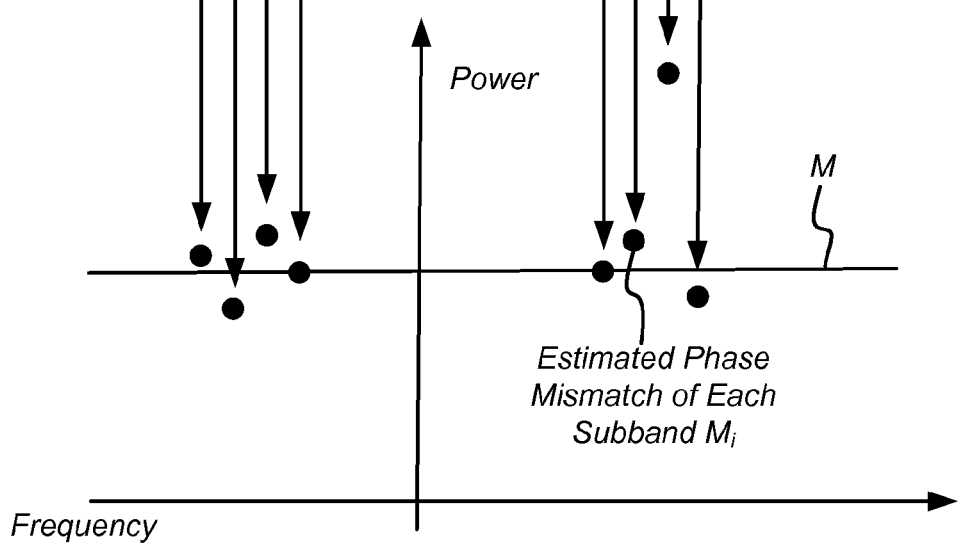

This substep 14 includes, for example, computing for each subband a ratio between the power of the real part of the signal and the power of its imaginary part to deliver an estimation of the gain mismatch. In the embodiment described, the substep 14 comprises also computing a correlation for each subband between the real part of the signal and its imaginary part upon a predetermined period, to deliver a value directly proportional to the sinus of the phase mismatch as represented in FIG. 2B, each dot referenced $m_i$ being the estimated phase mismatch of one subband.

These estimations, further to deliver values of the phase and gain mismatch, indicate the likelihood of the frequency values of the received signal for each subband. If an estimation value of the gain and phase mismatch is very different from the neighbouring values it indicates that the likelihood of the frequency values of the corresponding subband is low.

Thereafter, the method comprises a determination of the phase and gain mismatch for the entire segment using the estimated phase and gain mismatches of the subbands as estimation values and as indications of the likelihood of the frequency values of the received signal, in a step 20.

This determination is achieved to deliver a most probable value of gain and phase mismatch over all the estimations computed for the subbands. For example, this determination includes computing the median respectively between the phase and gain mismatches estimated values for the subbands in order to deliver the phase and gain mismatch estimation for the segment, as represented in FIG. 2B for the determination of the phase mismatch indicated as M.

In another embodiment, the determination of the phase and gain mismatch for the entire segment includes averaging, over a time period, respectively the estimated subbands phase and/or gain mismatches over the segment.

Advantageously, before computing the phase and gain mismatch for the segment, unlikely estimated values are cancelled.

For example for phase and/or gain, the values that are outside a predetermined range of tolerance centred on the median value are discarded as unlikely values.

Thus, at the end of step 20, the method delivers, for a segment of the base band digital signal, an estimation of the phase and gain mismatch that is not biased as it is realised taking into account the likelihood of the frequency values of the signal. Accordingly, the co-channels are detected and their influence is restricted over the segment.

In the embodiment described, the method continues by correcting the base band signal according to the determined phase and gain mismatch in a step 30. More precisely, the estimation is achieved periodically over one segment of the base band signal and the correction of the base band signal is achieved over an entire estimation period using the determined phase and gain mismatch for one segment. Thus, the step 20 is achieved only periodically at a rate adapted to the environment in order to match the changes that may occur on the received signal.

In another embodiment, the estimation of a phase and gain mismatch is achieved continuously in order to perform a real time correction of the base band signal.

Figure 3:
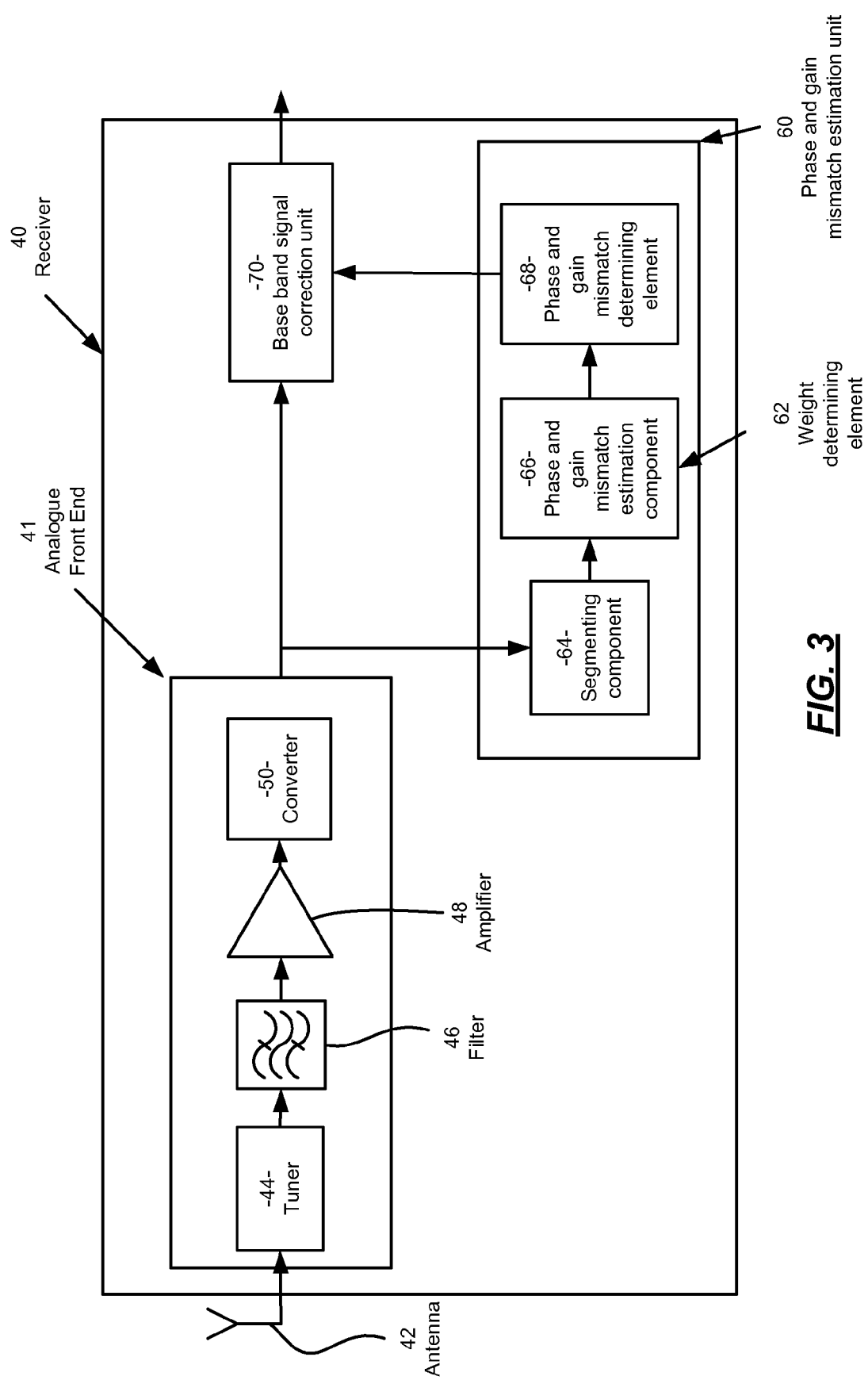
FIG. 3 is a schematic diagram of a digital signal receiver according to the present invention.

Referring now to FIG. 3, a digital signal receiver 40 is illustrated. This receiver comprises an analog front end 41 connected to an antenna 42 and including, for example, a tuner 44, a filter 46, and an amplifier 48 connected to a converter 50 and controlled by an automatic gain control unit not represented.

The output of the analog front end 41 is a base band digital signal that is transmitted to a phase and gain mismatch estimation unit 60. This unit 60 comprises a weight determining element 62 to determine weight coefficients upon likelihood of the frequency values of the received signal. This element 62 includes a segmenting component 64 to divide one segment of said base band digital signal into several bands. In the embodiment described, this segmenting component 64 includes several complex filters to filter the signal several times, each filtering delivering one subband.

Element 62 also includes a phase and gain mismatch estimation component 66 connected to the segmenting component 64 to estimate the phase and gain mismatches of each subband successively. Thus, the element 62 achieves the step 10 of the method described above. These estimated values represent the likelihood of the corresponding subband frequency value of the received signal.

Furthermore, the unit 60 comprises a phase and gain mismatch determining element 68 to determine the phase and gain mismatch for the processed segment of the received signal using the estimated phase and gain mismatches of the subbands delivered by the component 66 as such and also as indicators of the likelihood of the frequency values of the received signal.

Therefore, the element 68 is adapted to perform the step 20 of the method as described previously in FIG. 1 and deliver a non biased estimation of the phase and gain mismatch.

The output of the analogical front end 41 is also connected to a base band digital signal correction unit 70, which is also connected to the unit 60 to receive the phase and gain mismatch estimation. The unit 70 is adapted to correct the base band digital signal in a conventional manner.

Depending upon the various embodiments, the unit 60 is enabled periodically to deliver a phase and gain mismatch estimation over an estimation period of time or continuously to perform real time estimation.

In the embodiment described, the digital signal receiver is part of a Digital Television set or a wireless mobile device such as a radio telephone, a personal digital assistant, or a laptop.

Other embodiments of the method of the invention are also possible.

For example, as compared to the embodiment described above in which segmenting the segment of the signal comprises dividing the frequency spectrum of the segment into subbands, it can also comprises achieving a Fourier Transformation, each sample of the Fourier Transformation being an elementary sample that is a subband of the segment, upon which estimation of the phase and gain mismatch is achieved.

In such embodiment estimation is more accurate as it is realized on elementary subbands resulting from the Fourier Transformation.

Yet in another embodiment determining weight coefficients comprises directly estimating the likelihood values of the frequency values of the segment and then determining adaptive filter coefficients upon said likelihood values, said adaptive filter coefficients being weight coefficients. In such a case, estimating the phase and gain mismatch for the segment comprises filtering the sample with said adaptive filter coefficients and estimating the phase and gain mismatch of the filtered segment.

A digital signal receiver adapted to execute this embodiment of the method of the invention comprises, within the weight coefficients determining element, an estimation component to estimate the likelihood values of the frequency values of the segment and an adaptive filter coefficient determining component to determine such coefficients. The phase and gain mismatch determining element comprises an adaptive filter to filter the segment of the base band digital signal with said coefficients and a phase and gain mismatch estimation component to estimate the phase and gain mismatch over said filtered segment.

Many other additional embodiments are possible. For example, the method of the invention is executed by a processor program having a sequence of instructions stored on a processor readable medium to cause the processor to determine weight coefficients upon likelihood of the frequency values of the received signal and to determine a phase and gain mismatch for the processed segment of the received signal using said weight coefficients. This processor program can be integrated in any kind of article as for example, computers, laptops, mobile phones, television decoders, television sets and the like.

Of course the receiver and the program described can be adapted to achieve the method described above.

What is claimed is:

1. A method of estimating a phase and gain mismatch between the real part and the imaginary part of a segment of a base band digital signal, the method comprising:
    segmenting the segment of said base band digital signal into subbands in frequency, the method being characterized by:
    for each subband, estimating a phase and gain mismatch between the real and imaginary parts of the subband;
    for each subband, estimating a likelihood value representative of a likelihood of frequency values of the subband using the estimated phase and gain mismatch values of the subbands; and
    determining a phase and gain mismatch for the entire segment by using said estimated phase and gain mismatches of the subbands and the corresponding likelihood values.

2. The method of claim 1, wherein segmenting the segment into subbands comprises achieving a Fourier Transformation, each sample of the Fourier Transformation being a subband.

3. The method of claim 1, wherein segmenting the segment into subbands comprises dividing the frequency spectrum of the segment to form said subbands.

4. The method of claim 3, wherein segmenting the segment into subbands comprises filtering the signal with complex filters, one subband corresponding to one filtered signal.

5. The method of claim 1, wherein determining the phase or gain mismatch for the entire segment comprises discarding, as unlikely values, the estimated values of phase and gain mismatch that are outside a predetermined range of tolerance centred on the median value of the phase and mismatches of the subbands.

6. A method of receiving a base band digital signal, the method comprising:
    estimating the phase and gain mismatch of a segment of the base band digital signal according to claim 1; and
    correcting the base band signal according to the phase and gain mismatch determined previously.

7. The method of claim 6, wherein estimating is achieved periodically over one segment of the base band signal, and the method further comprises using the phase and gain mismatch of said segment determined previously to correct the base band signal over an entire estimation period.

8. The method of claim 6, wherein estimating and correcting are achieved continuously during the processing of the base band digital signal.

9. A computer program product comprising a computer readable medium wherein said computer program product resides having a plurality of instructions stored thereon which, when executed by a processor, result in the following operations:
    achieve a method according to claim 1.

10. A digital signal receiver comprising:
    a transposing unit to transpose an analogue signal into a base band digital signal;
    a phase and gain mismatch determination unit; and
    a base band digital signal correction unit,
    wherein the phase and gain mismatch determination unit comprises:
    a segmenting component to segment a segment of the base band digital signal into subbands in frequency and characterized by:
    a phase and gain mismatch estimation component to estimate for each subband a phase and gain mismatch between the real and imaginary parts of the subband,
    an estimation component to estimate for each subband a likelihood value representative of a likelihood of frequency values of the subband using the estimated phase and gain mismatch values of the subbands, and
    a phase and gain mismatch determining element to determine a phase and gain mismatch for the entire segment by using said estimated phase and gain mismatches of the subbands, and the corresponding likelihood values.

11. The method of claim 1, wherein, for each subband, the likelihood value is indicated by the estimated phase and gain mismatch of the subband.

12. The method of claim 1, wherein, for each subband, the likelihood value is indicated by the estimated phase and gain mismatch between the real and imaginary parts of the subband.

13. The method of claim 1, wherein determining said phase and gain mismatch for the entire segment comprises filtering the segment with an adaptive filter having adaptive filter coefficients, said adaptive filter coefficients being determine upon said estimated likelihoods.

14. The digital signal receiver of claim 10, wherein, for each subband, the likelihood value is indicated by the estimated phase and gain mismatch of the subband.

15. The digital signal receiver of claim 10, wherein the determining element is configured to discard, as unlikely values, the estimated values of phase and gain mismatch that are outside a predetermined range of tolerance centred on the median value of the phase and gain mismatches of the subbands.

16. The method of claim 1, wherein the likelihood of frequency values is an estimation of the matching between a frequency spectrum type of a received signal and a predetermined frequency spectrum.

17. The digital signal receiver of claim 10, wherein the likelihood of frequency values is an estimation of the matching between a frequency spectrum type of a received signal and a predetermined frequency spectrum.

* * * * *